United States Patent
Thibieroz et al.

(10) Patent No.: US 6,614,869 B1
(45) Date of Patent: Sep. 2, 2003

(54) ABSORBER ROD FOR NUCLEAR REACTOR CONTROL CLUSTER

(76) Inventors: Nathalie Thibieroz, 19, chemin du Charroi, 69300 Caluire (FR); Dominique Hertz, 35, Côte de l'Hormet, 69110 Sainte-Foy-les-Lyon (FR); Thierry Delannoy, 219, route de Tramoyes, 01120 La Boisse (FR); Dominique Duthoo, 22bis, rue des Etournelles, 26100 Romans-sur-Isere (FR)

( * ) Notice: Subject to any disclaimer, the term of this patent is extended or adjusted under 35 U.S.C. 154(b) by 0 days.

(21) Appl. No.: 09/869,713
(22) PCT Filed: Dec. 27, 1999
(86) PCT No.: PCT/FR99/03292
§ 371 (c)(1), (2), (4) Date: Jul. 2, 2001
(87) PCT Pub. No.: WO00/41183
PCT Pub. Date: Jul. 13, 2000

(30) Foreign Application Priority Data

Dec. 30, 1998 (FR) .............................. 98 16645

(51) Int. Cl.⁷ .................................. G21C 7/10
(52) U.S. Cl. ...................... 376/333; 376/327
(58) Field of Search ................. 376/327, 333

(56) References Cited

U.S. PATENT DOCUMENTS

| | | | | |
|---|---|---|---|---|
| 2,861,035 A | * | 11/1958 | Zinn et al. | 376/327 |
| 3,712,852 A | * | 1/1973 | Fisher | 376/333 |
| 4,432,934 A | * | 2/1984 | Gjertsen et al. | 376/333 |
| 4,676,948 A | * | 6/1987 | Cearley et al. | 376/333 |
| 4,798,699 A | * | 1/1989 | Cerni et al. | 376/327 |
| 4,820,475 A | * | 4/1989 | Mayers et al. | 376/327 |
| 4,873,117 A | * | 10/1989 | Hertz et al. | 376/327 |
| 5,742,655 A | * | 4/1998 | Hertz et al. | 376/333 |
| 6,028,906 A | * | 2/2000 | Kawashima et al. | 376/327 |

FOREIGN PATENT DOCUMENTS

| | | | | |
|---|---|---|---|---|
| JP | 3045591 | * | 2/1988 | 376/327 |
| JP | 3081296 | * | 4/1988 | 376/333 |
| JP | 3287097 | * | 12/1991 | 376/327 |

* cited by examiner

*Primary Examiner*—Harvey E. Behrend
(74) *Attorney, Agent, or Firm*—Kenyon & Kenyon

(57) ABSTRACT

The absorber rod comprises cladding (12) of stainless steel closed by plugs (14, 16) and containing a column of absorber pellets (24) e.g. of boron carbide. It also has an end bar (26) of hafnium secured to the bottom plug by a purely mechanical connection.

22 Claims, 3 Drawing Sheets

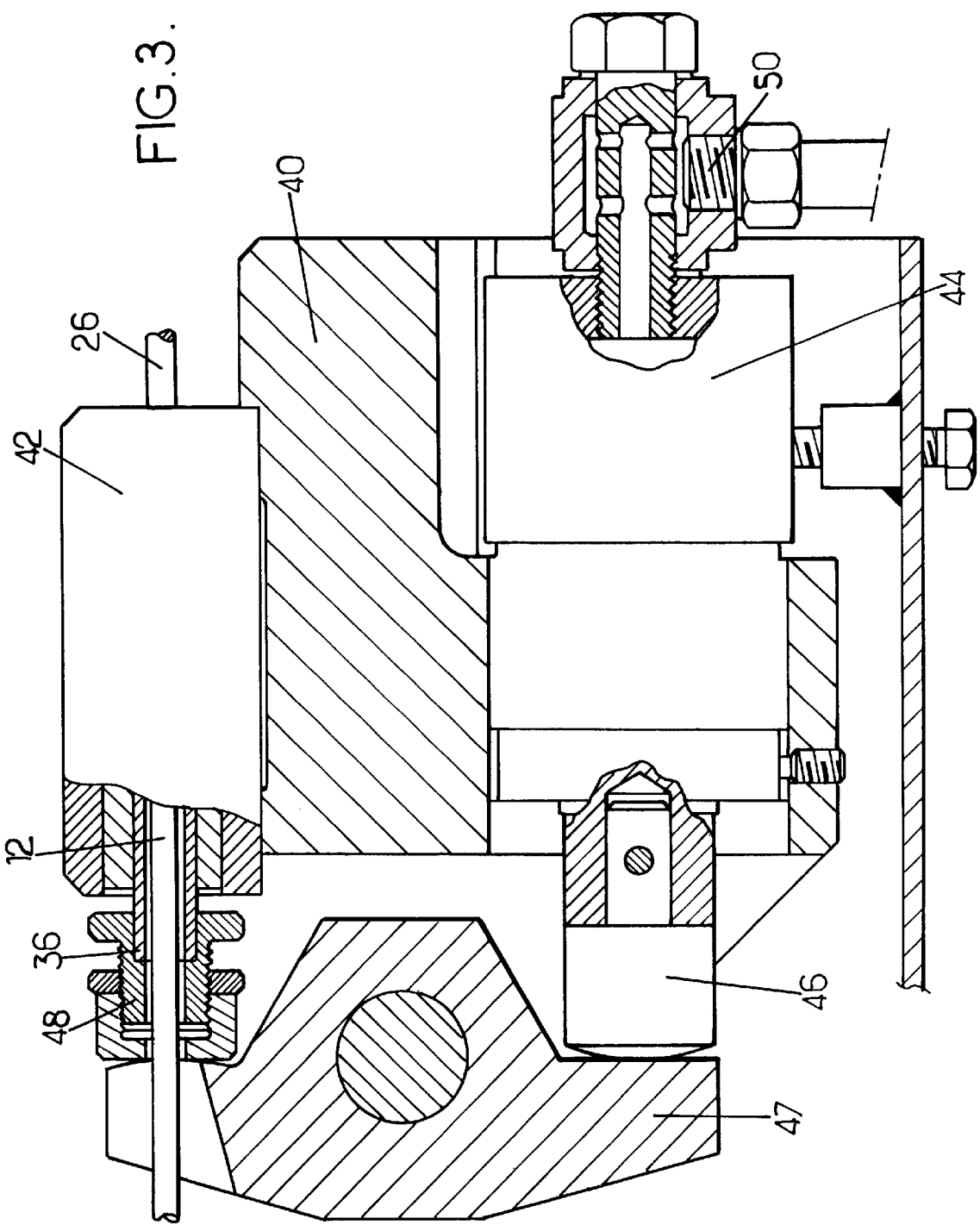

ABSORBER ROD FOR NUCLEAR REACTOR CONTROL CLUSTER

The present invention relates to absorber rods for inclusion in nuclear reactor control clusters. It is particularly usable in reactors that are moderated and cooled by pressurized water, where the core is constituted by fuel assemblies, each having a bundle of fuel rods held at the nodes of a regular array by a skeleton assembly formed by nozzles connected by guide tubes carrying rod spacer grids. Under such circumstances, each cluster is constituted by a spider connected to a control mechanism and carrying rods containing absorber material for the purpose of being inserted to a greater or lesser depth in the guide tubes or even for being completely extracted from the core.

Usually, a reactor has its power adjusted and is stopped by using various groups of clusters of different makeups (such as "black" clusters which are highly absorbent, and "gray" clusters which are less absorbent).

"Black" clusters are constituted by rods containing a highly absorbent material, such as an Ag-In-Cd alloy, also known as AIC, or boron carbide $B_4C$, in cladding which is generally made of stainless steel.

Those rods present limitations, in particular when they are for use in reactors operated to "follow load" and/or for very long use. The Ag-In-Cd alloy is subject to creep and to swelling under irradiation. Boron carbide $B_4C$ presents a large amount of swelling under irradiation which means that it cannot be used in the bottom portions of rods which are the portions that are inserted the most often into the core.

It is also known that hafnium absorbs neutrons and does not creep at the working temperatures and does not swell under irradiation. However it needs to be protected from hydriding if it is in steel cladding and it needs to be protected from wear if it is allowed to rub against guide elements. Welding it to the stainless steel used for making the protective cladding of rods containing boron carbide pellets gives rise to connections that are fragile and sensitive to hydriding, as explained below.

In theory, replacing Ag-In-Cd with hafnium in steel cladding makes it possible to avoid the absorber swelling. But the hafnium must not be allowed to hydride.

Attempts at making rods with hafnium in cladding have encountered difficulties. After the natural oxide film that forms on contact with air during manufacture has been worn away by friction, the hafnium absorbs the hydrogen that passes through the steel cladding and it swells, to such an extent that it can become necessary to change clusters prematurely.

A similar problem arises with "gray" cluster rods containing rods that are less absorbent.

Proposals have already been made (French patent application No. 96/07430, which issued as French Patent No. 2,749,968) to avoid the difficulty by using rods having bottom portions constituted by un-clad bars of HfZr or of hafnium, and replacing the stainless steel cladding in the top portion of the rod with cladding made of an Hfzr alloy containing pellets of $(HfZr)B_2$ or of HfZr.

To avoid adopting a cladding material that has mechanical characteristics that are very inferior to those of stainless steel, the invention seeks in particular to provide an absorber rod capable of withstanding irradiation over a long period of time in a reactor and also making it possible to retain stainless steel cladding and a stainless steel top connection plug for connection to a spider.

To this end, the invention provides in particular an absorber rod suitable for use in a control cluster and comprising stainless steel cladding closed by plugs and containing a stack of absorber pellets, the rod being characterized in that it also comprises an end bar of hafnium which is advantageously not clad, and which is secured to the bottom plug of the cladding by a surely mechanical connection. The stack of pellets is usually constituted by boron carbide; it could also be constituted by hafnium and zirconium boride, pure or mixed (as described in French patent application No. 96/07430) or indeed of rare earth oxides (europium, dysprosium), pure or mixed with other oxides.

The solid or hollow bar generally constitutes at least 15% of the length of the rod, i.e. of the distance over which the rod can be moved by its mechanism. Frequently, the bar constitutes about 25% of the total length of the rod. It is the bar which is inserted most frequently into the core.

The non-clad hafnium bar comes into direct contact with the pressurized water, it does not hydride, it does not swell, and it does not creep. However, in this use, hafnium that is not clad needs to be protected:

against wear, for the portion thereof that comes into contact with its neighbours; and against hydriding at the connection between the hafnium and the stainless steel.

The best protection is a layer of oxide which is established on an underlying diffusion layer that is impermeable to hydrogen and that withstands wear. This layer forms naturally in the medium that is to be found in pressurized water reactors (pressure about 150 bars and temperature in the range 280° C. to 350° C.) but only to a thickness that is generally not sufficient to provide effective protection against wear. This layer can also be created, prior to mounting the rod in the reactor, by applying surface treatment such as that described, for example, in document EP-A-0 421 868. In some cases, the thickness still runs the risk of being too little to withstand the highest amounts of wear.

An initial protective layer against wear can also be created by controlled oxidation of the outside surface in an atmosphere of pure oxygen or of oxygen and argon, at a temperature lying in the range 800° C. to 950° C. The layer is advantageously at least 5 micrometers ($\mu$m) thick initially (as described in French patent application No. 96/07430).

Rubbing tests performed in pressurized water have shown that it is desirable to have oxide to a thickness of at least 5 $\mu$m to 10 $\mu$m in order to withstand wear. However, if the thickness of oxide formed by thermal oxidation is too great, then stresses at the metal/oxide interface are high and can lead to the oxide layer spalling off. Nevertheless, even if the oxide does spall off, resistance to wear continues to be provided by the underlying diffusion layer providing it is of sufficient thickness (of the order 12 $\mu$m to 15 $\mu$m).

The oxidizing process advantageously establishes an oxide layer that is sufficiently thick to prevent hydriding (in particular in the zones connected to austenitic stainless steel) and forms a diffused layer that is quite thick and withstands stresses associated with wear.

An oxide layer that is too thick, exceeding 10 $\mu$m, runs the risk of spalling. A good compromise can be achieved by aiming for an oxide layer that is 5 $\mu$m to 10 $\mu$m thick and a diffusion layer having a depth of 15 $\mu$m to 50 $\mu$m, and in particular of 25 $\mu$m to 30 $\mu$m. There is generally no point in attempting to obtain a thicker diffused layer, given the wear stresses that are encountered by absorber rods in pressurized water nuclear reactors.

A compromise can be found by limiting the treatment temperature so as to leave time for diffusion to take place and thus for internal stresses to decrease, and by limiting the rate at which oxygen is supplied either by limiting its partial pressure during oxidization by acting on the total pressure and on its dilution, or by interleaving diffusion stages between the oxidizing stages. The flow speed of the oxidizing gas is another parameter of the process.

Thus, to achieve a density per unit area of included oxygen lying in the range 0.0001 liters per square centimeter (l/cm$^2$) of substrate to 0.01 l/cm$^2$ of substrate, oxidation performed at 860±10° C. for 6 hours at a total pressure in the range 0.1 millibars (mbar) to 0.7 mbar in an argon atmosphere containing 3% to 25% oxygen makes it possible to obtain, on hafnium containing 300 parts per million (ppm) of iron and 300 ppm of oxygen, an oxide thickness of 6±1 μm and a diffused layer to a depth of 35 μm to 50 μm.

A similar result can be obtained by thermal oxidation for 6 hours at 920±10° C. in an argon atmosphere containing 3% oxygen and acting on the duration of the oxidation and diffusion stages, e.g. by repeating the following cycle six times:

oxidation for 1 minute; and
diffusion under pure argon for 1 hour.

More generally, it is possible to make a protective layer by controlled oxidation of the hafnium over a period of 3 hours to 12 hours at a temperature in the range 820° C. to 950° C. using oxygen diluted to a concentration of 1% to 50% under low pressure (a few fractions of a millibar); it is also possible to use oxidation-diffusion treatment in which the duration of the oxidation lies in the range 0.1% to 10% of the total time of the treatment.

Since stainless steel is permeable to atomic hydrogen, it is necessary to preserve the hydrogen-impermeable layer of oxide over the connection between the bottom plug of the cladding and the bar and/or to allow for said oxide layer to be renewed on contact with water. Most conventional joining methods do not allow this condition to be satisfied and/or lead to a connection between the hafnium and the steel that is fragile and incompatible with the alternating stresses that are to be encountered during reactor operation.

For example, thermally welding hafnium directly to steel gives rise to intermetallic phases which make the connection fragile, and in addition welding gives rise to continuity of material through which hydrogen can migrate from the stainless steel to the hafnium. Solid state welding, e.g. by diffusion or by friction, leads to connections that are too fragile and also leads to continuity of material that gives rise to hydriding.

Purely mechanical connections make it possible to avoid the above drawbacks. Suitable methods include the following in particular:

cold isostatic compression assembly making it possible to obtain crimped connections having good mechanical characteristics but without creating continuity of material; and screw assembly where the bar is screwed into the plug, with the threaded connection being prevented from rotating by being deformed.

It is also possible to consider assembly by magnetostriction or by explosion, thereby providing a crimped connection that is extremely robust. Nevertheless, this solution suffers from the drawback of requiring the presence of an aluminum alloy thruster, given the insufficient electrical conductivity of stainless steel and hafnium. The thruster remains connected to the part, and removing it mechanically or by caustic soda etching runs the risk of damaging the connection.

It is also possible to envisage assembly by interfitting the two components that are to be connected together, boring a hole, and inserting a pin. Nevertheless, that solution is mechanically weaker than using a braked screw connection.

The invention also provides a method of assembly by cold isostatic compression which can be used not only for making an absorber rod, but also whenever it is desirable to make a connection between a part made of hafnium or a material presenting similar characteristics (such as zirconium and titanium) and a part made of stainless steel, of nickel alloy, or any other alloy that cannot be welded to materials of the hafnium class, one of the two parts being formed in the portion that is to be mounted, as a tube which receives the other part, which is in the form of a solid cylinder.

The invention will be better understood on reading the following description of particular embodiments, given as non-limiting examples. The description refers to the drawings, in which:

FIG. 3 is a fragmentary elevation and section view of a device for making the crimped connection shown in FIG. 2;

Figure 1:
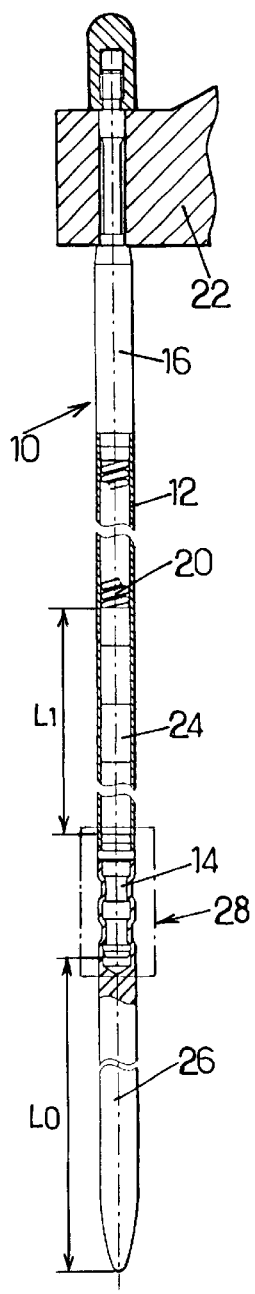
FIG. 1 is an elevation and section view of a rod constituting a first embodiment of the invention, having a crimped connection between the hafnium bar and the end plug of the cladding.

The rod 10 shown in FIG. 1 has cladding 12 closed by a connection plug 14 and by a top plug 16, and it contains a column of absorber material held pressed against the bottom connection plug 14 by a spring 20 which is compressed between the column and the top plug 16. The top plug 16 enables the rod to be secured to a finger of a spider 22. The top plug 16 and the means enabling it to be fixed to the spider 22 can be of the structure described in particular in French patent application No. 95/15488 (which issued as French Patent No. 2,742,912 and which issued as U.S. Pat. No. 5,889,832), to which reference can be made.

The rod is of conventional shape, having a diameter that is constant except that its bottom end is bullet-shaped to make it easier to insert rods into the guide tubes of an assembly when an absorber cluster is lowered. The cladding 12, the connection plug 14, and the top plug 16 are advantageously made of austenitic stainless steel of a grade that enables them to be welded electrically with a tungsten electrode (TIG welding). The outside surface of the cladding, of the top plug, and of the connection plug is advantageously subjected to nitriding treatment prior to assembly so as to increase resistance to wear. An austenitic steel makes it possible to perform ionic nitriding treatment of good quality with low sensitivity to corrosion. The nitriding can be performed by the method described in document FR-A-2 604 188, to which reference can be made.

In general, the pellets 24 occupying the cladding are made of boron carbide. Their diameter is slightly smaller than the inside diameter of the cladding 12, so as to allow them to be insetted and so as to accommodate swelling. The cladding can have an outside diameter of 9.68 millimeters (mm) and it can be about 1 mm thick, as is common in pressurized water reactors. In conventional manner, the spring 20 can be made of an "Inconel" type alloy.

The connection plug 14 is fixed to a bar 26 of hafnium, which is solid in the example shown in FIG. 1. The total length L0 of the bar 26 generally lies in the range 25% to 35% of the length L1 of the column of pellets 24.

The hafnium bar 26 is fixed to the connection plug 14 by a connection that is purely mechanical.

Figure 2:
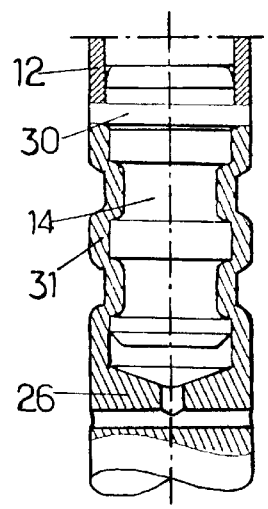
FIG. 2 is a larger scale view of the region of the crimped connection, outlined by a dot-dashed line in FIG. 1.

In the example shown in FIGS. 1 and 2, this connection is performed by crimping in the zone outlined by box 28. For this purpose, the connection plug 14 has a top portion which is engaged inside the cladding and a flange 30 which bears against the bottom edge of the cladding and which is welded to the cladding. The plug has an extension with circumferential grooves or channels machined therein, there being two such grooves in FIG. 2. The bar 26 is terminated by a thin tubular zone 31 constituting a skirt, which zone is deformed into the grooves of the connection plug 14 once they have been assembled together. It can be seen that the absorber column thus presents only very little discontinuity, because of the presence of the skirt.

An axial bore is formed at the end of the skirt and opens out into a hole which is used for suspending the bars during oxidation treatment; this hole allows water to flow inside the connection and regenerate the oxide layer constantly.

Figure 4:
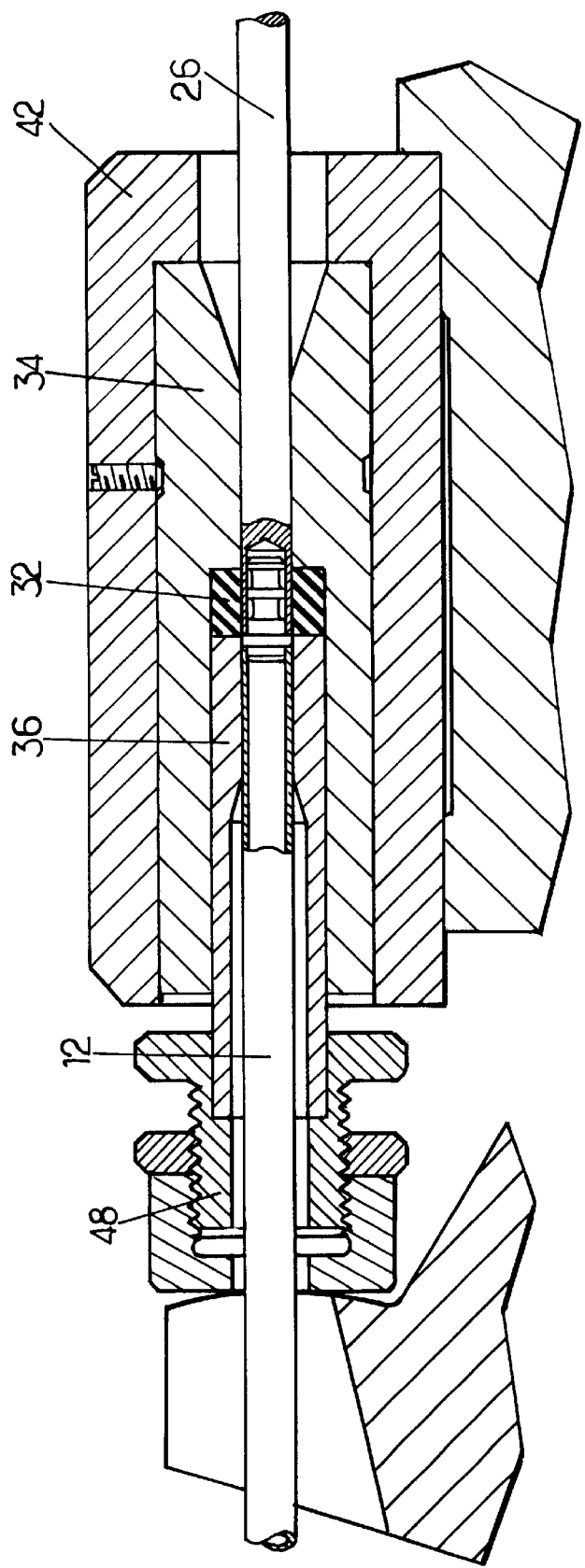
FIG. 4 is a larger scale view showing a detail of FIG. 3, showing the components involved in crimping.

The crimping is advantageously performed by cold isostatic compression, for example using apparatus of the kind shown in FIGS. 3 and 4.

This method and apparatus can be used to assemble together parts made of two different materials that are unsuitable for conventional thermal welding, which materials can be other than hafnium and stainless steel.

The components to be crimped together (the hafnium bar and the cladding provided with plugs as shown in FIG. 2) are placed in such a manner that the zone to be crimped is in register with a ring 32 of a material which is deformable but incompressible or only very slightly compressible, such as certain elastomers. At rest, the inside diameter of the ring 32 is slightly greater than the outside diameter of the cladding to be deformed. The length of the ring 32 matches the length of the crimping that is to be performed. When crimping cladding to a hafnium bar as shown in FIG. 1, the length of the ring lies in the range a few millimeters to about 15 mm. Its outside diameter is about 10 mm greater than its inside diameter.

It is radial deformation of the ring under the effect of axial compression that performs the crimping.

In FIG. 4, it can be seen that the ring 32 is enclosed in a chamber defined by a high strength steel sleeve 34 and an annular piston 36 which slides in a bore of the sleeve. The sleeve is pierced by a hole for inserting the bar 26. The inside diameter of the piston is designed to allow the cladding 12 to pass through it.

The apparatus includes a mechanism for urging the piston 36 into the sleeve. This mechanism is carried by a frame 40 to which there is secured a housing 42 for receiving the sleeve. The frame carriers a hydraulic actuator 44 whose plunger 46 bears against a rocker arm 47. The rocker arm bears against the piston 36 via an adjustment module constituted by two washers 48 that are screwed one in the other. These washers are pierced by a central hole and the arm 47 has a slot so as to allow the components for crimping together to pass through them freely.

When the actuator is powered via pipe 50, it compresses the ring 32 which swells inwards so as to deform the tubular zone 31 of the bar and convert it from the shape shown in FIG. 4 to the shape shown in FIG. 2.

The apparatus described above can be varied in numerous ways. Crimping can be performed in a single groove, thus enabling the length of the ring 32 to be shortened. Two rings separated by a spacer (or more than that) can be provided so that each ring acts over a groove. Crimping can be performed from the inside, in which case the ring 32 is placed inside the two tubular portions that are to be assembled together so as to give rise to expansion.

Figure 5:
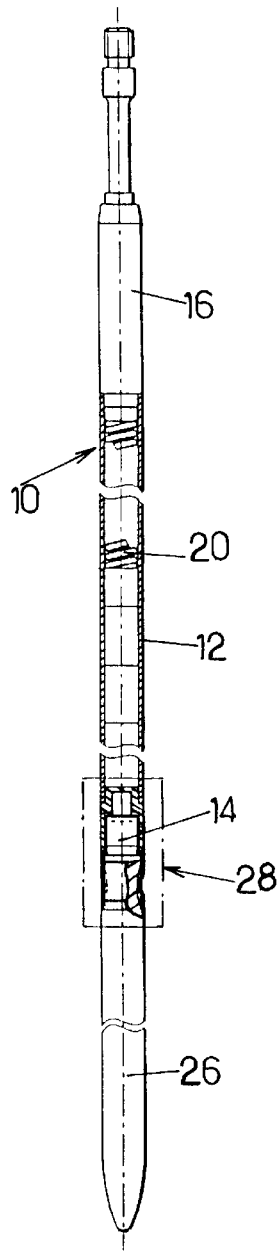
FIG. 5 is similar to FIG. 1 and shows a rod having a threaded and locked connection.
Figure 6:
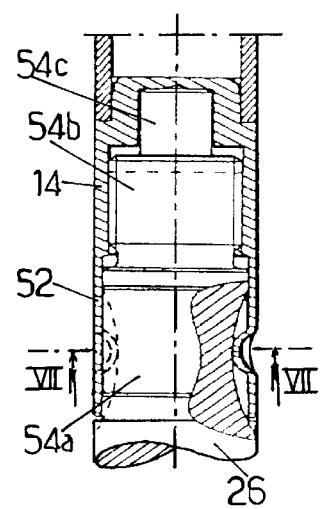
FIG. 6 is similar to FIG. 2 and is a larger scale view of the assembly zone.
Figure 7:
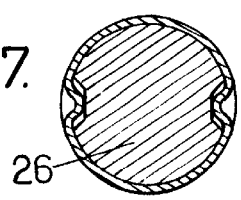
FIG. 7 is a sectional view on line VII—VII of FIG. 6.

The mechanical connection can also be provided by a screw connection, as shown in FIGS. 5 to 7 where members corresponding to those of FIGS. 1 and 2 are referenced by the same reference numerals. In this case, the connection plug 14 comprises in succession a portion which engages in the end portion of the cladding and which is terminated by a bearing shoulder, a tapped portion, and a thin deformable skirt 52. This connection plug 14 is welded to the cladding. The bar 26 is terminated by three zones of decreasing diameters. The first zone 54a has longitudinal notches (two such notches in the example shown) for receiving deformed zones of the skirt in register therewith so as to prevent the bar from turning. It also has centering zones so as to facilitate assembly. The second zone 54b is threaded and enables the bar to be assembled to the connection plug. It is designed to be screwed into the tapped portion of the plug and to be tightened with determined torque. The thread is dimensioned in such a manner as to provide sufficient mechanical resistance to the fatigue stresses to which it will be subjected in a reactor. Finally, the third zone 54c is constituted by an extension which engages inside the plug so as to ensure axial continuity of neutron absorption. After the bar has been fixed, it is locked against rotation by deforming the skirt 52 using a punch of suitable shape to press the skirt into the notches.

Water can penetrate into this connection and can serve continuously to regenerate the protective oxide layer on the hafnium.

Figure 8:
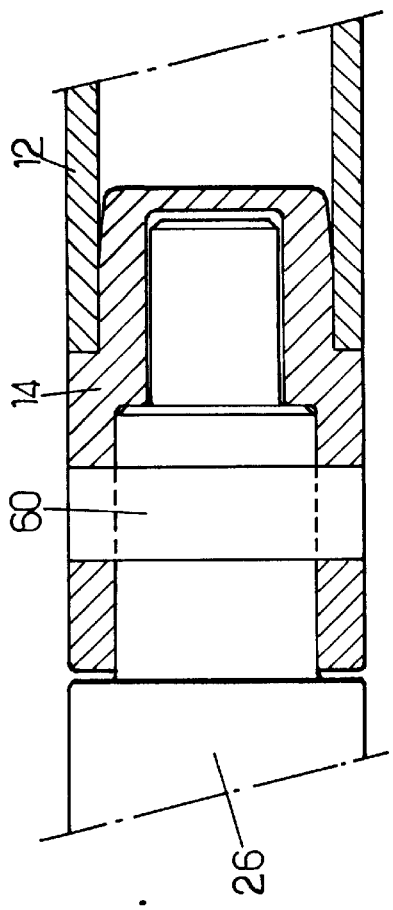
FIG. 8 is a sectional view of a modified embodiment.

Finally, the mechanical connection shown in FIG. 8, where members corresponding to those of FIG. 6 are referenced by the same references, has a connection plug 14 with a chamber for receiving a reduced-diameter terminal portion of the bar 26. A pin 60 is engaged in two aligned transverse bores in the connection plug 14 and the terminal portion of the bar.

What is claimed is:

1. An absorber rod comprising:
   a stainless steel cladding;
   a top plug and a bottom plug of stainless steel closing said cladding;
   a column of neutron absorber pellets in said cladding; and
   an end bar of hafnium fixed to the bottom plug by a purely mechanical connection.

2. A rod according to claim 1, wherein said neutron absorber pellets are boron carbide pellets.

3. A rod according to claim 1, wherein the mechanical connection is a connection by cold isostatic compression crimping.

4. A rod according to claim 3, wherein the bottom plug has a top portion engaged in the cladding and a flange bearing against the bottom edge of the cladding and welded to the cladding, and an extension in which circumferential grooves are machined, and the bar is terminated by a thin-walled tubular zone constituting a skirt deformed into the grooves of the plug extension.

5. A rod according to claim 1, wherein the bar has an initial protective oxide layer at least 5 $\mu$m thick and has oxygen diffusion over a depth of at least 25 $\mu$m.

6. A rod according to claim 5, wherein the protective layer is obtained by controlled oxidation of the hafnium bar, for 3 to 12 hours, at a temperature in the range 820° C. to 950° C., in oxygen diluted to a concentration of 1% to 50% in an inert gas, under low pressure.

7. A rod according to claim 5, wherein the protective layer is obtained by an oxidation and diffusion process in which the duration of oxidation lies in the range 0.1% to 10% of the total treatment time.

8. A rod according to claim 1, wherein the cladding and the plugs are made of austenitic stainless steel.

9. A rod according to claim 1, wherein an outside surface of the cladding, of the top plug and of the bottom plug is nitrided.

10. A rod according to claim 2, wherein the bar has a length in the range of 25% to 35% of a length of the column of boron carbide pellets.

11. An absorber rod according to any one of claims 1, 2, 3, 10, in a nuclear reactor.

12. A control cluster for a nuclear reactor, said control cluster comprising a spider for connection to a control mechanism and a plurality of absorber rods, said absorber rods being connected by top ends to the spider, each absorber rod comprising:

a stainless steel cladding;

a top plug and a bottom plug of stainless steel closing said cladding;

a column of neutron absorber pellets in said cladding; and an end bar of hafnium fixed to the bottom plug by a purely mechanical connection, the end bars of hafnium being separate one from the other.

13. The control cluster of claim 12, wherein the neutron absorber pellets are boron carbide pellets.

14. The control cluster of claim 12, wherein the mechanical connection is a screwed connection.

15. The control cluster of claim 12, wherein the mechanical connection is a connection by cold isostatic compression crimping.

16. The control cluster of claim 15, wherein the bottom plug has a top portion engaged in the cladding and a flange bearing against a bottom edge of the cladding and welded to the cladding, and an extension in which circumferential grooves are machined, and the bar is terminated by a thin-walled tubular zone constituting a skirt deformed into the grooves of the plug extension.

17. The control cluster of claim 12, wherein the bar has an initial protective oxide layer at least 5 µm thick and has oxygen diffusion over a depth of at least 25 µm.

18. The control cluster of claim 17, wherein the protective layer is obtained by controlled oxidation of the hafnium bar, for 3 to 12 hours, at a temperature in the range 820° C. to 950° C., in oxygen diluted to a concentration of 1% to 50% in an inert gas, under low pressure.

19. The control cluster of claim 17, wherein the protective layer is obtained by an oxidation and diffusion process in which the duration of oxidation lies in the range 0.1% to 10% of the total treatment time.

20. The control cluster of claim 12, wherein the cladding and the plugs are made of austenitic stainless steel.

21. The control cluster of claim 12, wherein an outside surface of the cladding, of the top plug and of the bottom plug is nitrided.

22. The control cluster of claim 13, wherein the bar has a length in the range 25% to 35% of a length of the column of boron carbide pellets.

* * * * *

UNITED STATES PATENT AND TRADEMARK OFFICE
CERTIFICATE OF CORRECTION

PATENT NO. : 6,614,869 B1
DATED : September 2, 2003
INVENTOR(S) : Nathalie Thibieroz et al.

It is certified that error appears in the above-identified patent and that said Letters Patent is hereby corrected as shown below:

Title page,
Item [73], please insert the Assignees -- Tour Framatome, Courbevoie, France, Compagine Generale Des Matieres Nuclearies, Velizy-Villacoublay, France, and STE Franco-Belge De Fabrication De Combustibles, Courbevoie, France --.

Signed and Sealed this

Tenth Day of August, 2004

JON W. DUDAS
*Acting Director of the United States Patent and Trademark Office*